UNITED STATES PATENT OFFICE.

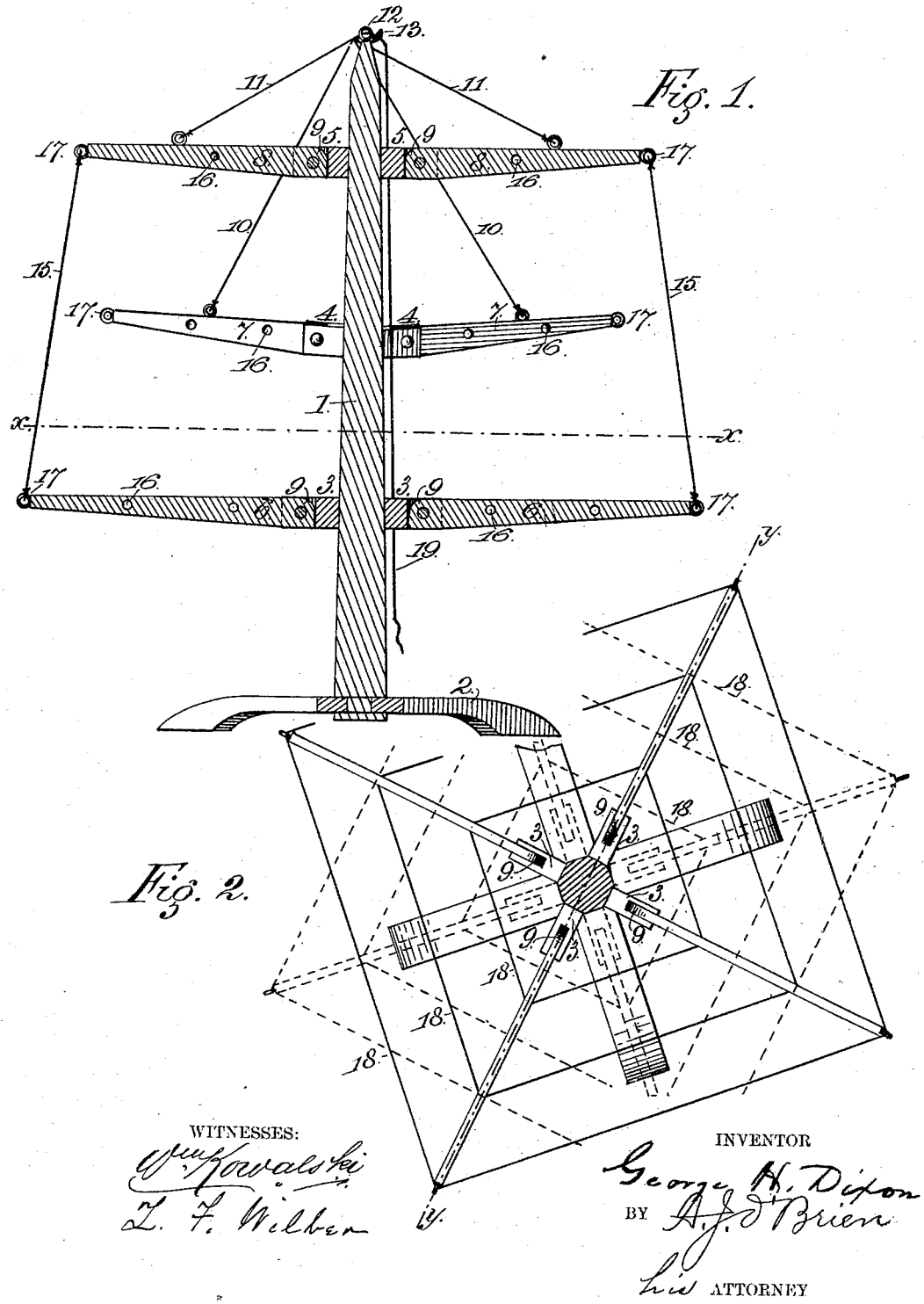

GEORGE H. DIXON, OF DENVER, COLORADO.

CLOTHES-DRIER.

SPECIFICATION forming part of Letters Patent No. 418,279, dated December 31, 1889.

Application filed August 23, 1889. Serial No. 321,792. (No model.)

*To all whom it may concern:*

Be it known that I, GEORGE H. DIXON, a citizen of the United States, residing at Denver, in the county of Arapahoe and State of Colorado, have invented certain new and useful Improvements in Clothes-Horses; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to an improvement in clothes-horses; and the object of my improvement is to provide a clothes-horse suitable for use in laundries, private families, and hotels, of simple and economical construction, durable, easily operated, and of any desired capacity.

With this end in view my invention consists of the features hereinafter described and claimed, and illustrated in the accompanying drawings, in which—

Figure 1 is a vertical section taken on the line $y\,y$, Fig. 2. Fig. 2 is a horizontal section taken on the line $x\,x$, Fig. 1.

In the drawings, let the reference-numeral 1 indicate a standard secured to and capable of rotation within a suitable platform or support 2. Secured to the standard 1, made stationary thereon, and arranged in series around the same are the brackets 3, 4, and 5, each series consisting of a plural number of brackets, four being the number shown in the drawings. Suitably pivoted within the brackets 3, 4, and 5 are the arms 6, 7, and 8, the inner extremities of which are rounded within the brackets, as shown at the points 9, so that the arms may be raised to a vertical position or to a position in which their outer extremities are in contact with the standard 1. On the other hand, the inner extremity of each arm is so shaped that the arm cannot fall below a horizontal position, the lower inner corner of each arm being right-angled to correspond with the shape of the rear part of the bracket against which it bears. To each arm 7 is attached one end of a cord 10 and to each arm 8 one end of a cord 11. Cords 10 and 11 pass upward through the eye 12, secured to the top of the standard, and unite in a button, knot, or enlargement 13. To button 13 is also attached the cord 19, which hangs beside the standard, but does not pass through the eye 12. By pulling upon cord 19 the arms 7 and 8 are raised. Arms 6 are connected with arms 8 by means of cords 15. Thus it will be seen that by means of this connection arms 6, 7, and 8 are raised simultaneously. The arms are all provided with an eye 17 in their outer extremity and with apertures 16 between these eyes and the standard, through which pass the cords 18, which support the clothes.

Two series of arms and their connecting-cords are shown in Fig. 2, the lower series in full lines and the upper series in dotted lines.

It will be observed that standard 1 may be of any desired height; also, that the number of series of arms, the length of the arms, and the number of cords 18 used may be as desired.

Having thus described my invention, what I claim is—

A clothes-horse consisting of a standard, series of arms hinged to the standard, each series being arranged horizontally around the same, cords 10 and 11, attached to the arms, an eye 12 in the top of the standard, through which all the cords pass, a knot, button, or enlargement in which all the cords center after passing through said eye, and a cord 19, connected with the button, but not passing through the eye 12, substantially as described.

In testimony whereof I affix my signature in presence of two witnesses.

GEORGE H. DIXON.

Witnesses:
Z. F. WILBER,
BRINTON GREGORY.